(12) United States Patent
Garry et al.

(10) Patent No.: US 8,262,802 B2
(45) Date of Patent: Sep. 11, 2012

(54) METHOD OF REMOVING DEPOSITS

(75) Inventors: Ian M Garry, Thurcaston (GB); James R I Lloyd, Wakefield (GB); Tomas Butler, Enumclaw, WA (US)

(73) Assignee: Rolls-Royce, PLC, London (GB)

( * ) Notice: Subject to any disclaimer, the term of this patent is extended or adjusted under 35 U.S.C. 154(b) by 670 days.

(21) Appl. No.: 11/806,036

(22) Filed: May 29, 2007

(65) Prior Publication Data

US 2008/0006301 A1    Jan. 10, 2008

(30) Foreign Application Priority Data

May 27, 2006 (GB) .................................. 0610578.7

(51) Int. Cl.
*B08B 9/32* (2006.01)
(52) U.S. Cl. ..... 134/22.12; 134/8; 134/22.1; 134/22.11; 134/22.18
(58) Field of Classification Search .................. 134/32, 134/33, 34, 36, 42
See application file for complete search history.

(56) References Cited

U.S. PATENT DOCUMENTS

| | | |
|---|---|---|
| 4,248,940 A | 2/1981 | Goward et al. |
| 4,321,311 A | 3/1982 | Strangman |
| 5,262,245 A | 11/1993 | Ulion et al. |
| 5,485,858 A | 1/1996 | Schmidt |
| 5,514,482 A | 5/1996 | Strangman |
| 5,645,893 A | 7/1997 | Rickerby et al. |
| 5,667,663 A | 9/1997 | Rickerby et al. |
| 5,707,453 A * | 1/1998 | Shurman et al. .............. 134/1 |
| 5,820,693 A * | 10/1998 | Patchett et al. .......... 134/22.12 |
| 5,934,566 A * | 8/1999 | Kanno et al. ................... 239/398 |
| 6,004,620 A * | 12/1999 | Camm .......................... 427/142 |
| 2003/0173213 A1 | 9/2003 | Lee et al. |
| 2004/0106360 A1* | 6/2004 | Farmer et al. .................... 451/38 |
| 2005/0048873 A1* | 3/2005 | Alberts et al. ..................... 451/5 |
| 2005/0126001 A1 | 6/2005 | Hanley |

FOREIGN PATENT DOCUMENTS

| | | |
|---|---|---|
| DE | 198 32 767 A1 | 1/2000 |
| EP | 0 826 457 A1 | 3/1998 |
| EP | 0 916 445 A2 | 5/1999 |
| EP | 1 340 587 A2 | 9/2003 |
| FR | 2 810 267 A1 | 12/2001 |
| JP | 09-158702 A | 6/1997 |
| JP | A-2001-054771 | 2/2001 |
| WO | WO 97/15407 A1 | 5/1997 |

* cited by examiner

*Primary Examiner* — Michael Kornakov
*Assistant Examiner* — Ryan Coleman
(74) *Attorney, Agent, or Firm* — Oliff & Berridge, PLC

(57) ABSTRACT

A method of removing a deposit from a passage extending through a component includes immersing the passage within a liquid, and directing a liquid jet at the passage from a source within the liquid bath and with a sufficient velocity so as to remove at least a portion of the deposit.

20 Claims, 4 Drawing Sheets

METHOD OF REMOVING DEPOSITS

BACKGROUND

The present invention relates generally to a method of removing material from a component having holes through its walls. In particular it relates to a method of removing excess coating material from within cooling holes of coated gas turbine components.

Gas turbine engines operate at extremely high temperatures for increased performance and efficiency. A limiting factor in most gas turbine engine designs, however, is the maximum temperature that various components of the engine can tolerate. One such particular component area which is so limited is the combustion chamber of a gas turbine engine.

One method to increase the maximum allowable temperature and/or decrease the component metal temperature is to provide cooling holes in the walls of the component. These holes allow cool air to flow through and along the walls of the component exposed to the high gas temperatures. As the air flows along the surface of the walls it forms a cool layer. This cool layer reduces the temperature of the wall surface and physically keeps the hot gases from contacting the walls of the component, thereby permitting the component to withstand higher gas temperatures than would otherwise be possible.

Another method of allowing higher gas temperatures to be used is to apply a protective thermal barrier coating to the walls of the component that are exposed to the hot gases. In the case of combustors this is, in particular, the inner walls of the flame tube, the outer walls being exposed to cooler compressor delivery air. Such coatings conventionally comprise, for example a MCrAlY material which offer thermal and corrosion protection. MCrAlY refers to known coating systems in which M denotes nickel, cobalt,iron or mixtures thereof; Cr denotes chromium; Al denotes aluminium; and Y denotes yttrium. A further ceramic layer is also often applied on top of the MCrAlY layer to give improved thermal protection. In such an arrangement the MCrAlY layer acts as a bond coat for the ceramic coating layer. An example of such a ceramic coating material is yttria stabilised zirconia which is applied on top of an MCrAlY layer.

The MCrAlY and ceramic protective coatings are typically applied by physical vapour deposition (PVD), chemical vapour deposition (CVD) or plasma spraying means. Examples of such protective coatings and the methods of applying them are well known and are described in: U.S. Pat. No. 4,321,311, U.S. Pat. No. 5,514,482, U.S. Pat. No. 4,248,940 among many others.

Cooling holes and protective coatings can, and are, used in conjunction to allow operation of a component at a high temperature. There are two basic methods for producing such components that have cooling holes and a protective coating. In the first method the coating is applied to the component and then the holes are drilled through the coated component. Examples of this method are described in EP0826457 in which laser drilling is used to penetrate a thermal barrier coating and the metal of the component. A problem with this method is that, by design, the thermal barrier coating is resistant to heating produced by the laser to drill through the material. Consequently drilling of the coating requires a high power laser, a prolonged operation, and results in considerable heating of the surrounding area which can be undesirable. Problems also exist if mechanical drilling techniques are used since the thermal barrier coatings are generally brittle. Mechanical drilling can crack and damage the coating in the region around the holes causing the coating to fall off the component either during the machining operation or prematurely during service.

In the second method holes are drilled in the component and then the coating is applied to drilled component. This method does not have any of the problems associated with drilling/machining through the coating described above. However application of the coating after the holes have been drilled does tend to at least partially block some or all of the holes. This restricts the flow of cooling air through the holes and can result inadequate cooling of the component producing hot spots, overheating and possible failure of the component. Furthermore the blocking of the cooling holes is unpredictable and so designing the holes to accommodate a degree of blockage is problematic and also, if it is possible will reduce the efficiency of the engine.

Consequently any coating material blocking the cooling holes has to be removed. The problem of cooling hole blockage and a method of removing the coating from a cooling hole is described in EP0916445. A fluid jet at a high pressure is directed at the opposite face of the component to that to which the coating has been applied. The through holes then act as a mask and protect the coating from damage.

Fluid jets operating at high pressure, up to 60000 psi, are noisy at levels of the order 120 dB. Additionally, careful control is required to prevent damage to the surface of the component against which the fluid jet is directed.

It is therefore desirable to provide an improved method of removing material from holes within a component that addresses the above mentioned problems and/or offers improvements generally to such methods.

SUMMARY

According to the present invention there is provided a method of removing a deposit from a passage extending through a component comprising the steps, immersing the passage within a liquid, directing a liquid jet at the passage from a source within the liquid and with a sufficient velocity so as to remove at least a portion of the deposit.

In this method the liquid within which the passage is immersed acts to attenuate the noise of the process.

The deposit may be contiguous with a coating provided on a first surface of the component, with the liquid jet preferably being directed at the passage from a second surface of the component opposite the first surface.

In this method the component itself is used as a mask to direct a high pressure fluid jet though a cooling hole, whereupon it machines away and removes any material blocking the hole. This has the advantage that the jet does not have to be accurately directed at a particular hole allowing a less accurate, cheaper and simpler machine to be used. In addition the remainder of the coating which is not blocking the hole is protected from the jet by the component itself. Any damage to the coating is therefore reduced. The use of the component itself as a mask also means that the process is simple and relatively rapid.

The liquid jet may further comprise solid particles disposed therein. The solid particles may be glass beads.

The passages in the component preferably have an axis that is angled relative to the first and second surface. The jet preferably has a negative rake relative to the axis of the passage of between 0 and 5 degrees in this way the jet may be directed towards the debris and can remove the debris from the hole without damaging the hole entrance.

Preferably the method further comprises the step of subsequently directing a second liquid jet at the passage from a second source within the liquid bath. Preferably the second liquid containing jet further comprises gas admixed therein.

The second jet is preferably directed at the passage with a positive rake angle of 0 to 5 degrees relative to the axis of the passage. The second jet cleans the passage and the positive rake angle helps to prevent chipping of the coating at the hole exit The component may have a plurality of passages and the method comprise directing the first liquid jet at a first one of the plurality of passages and then traversing the jet across the second surface of the component to a second passage and directing the first liquid jet at a second one of the plurality of passages.

The second liquid jet may be traversed with the first liquid jet to direct the second liquid jet at the first one of the plurality of passages after the first liquid jet has been directed thereat.

Preferably the first liquid jet is traversed at a constant rate over a region of the second surface of the component in which the passages are located Substantially all the deposit within the first one of the plurality of passages may be removed before the first liquid jet is traversed to the second one of the plurality of passages.

The component may be rotated about an axis and relative to the first liquid jet such that the fluid jet is intermittently directed at the passage. Preferably the axis is orthogonal to the direction in which the first liquid jet traverses.

Preferably the fluid within which the passage is immersed has a current which flows towards the component. Preferably the current flows towards the first surface of the component.

Preferably the passage is arranged to provide, in use, a cooling flow for the component. The component may be made from metal and the deposit ceramic. The component may be a combustor flame tube, or a turbine blade.

BRIEF DESCRIPTION OF THE DRAWINGS

The present invention will now be described, by way of example only, with reference to the accompanying drawings in which.

DETAILED DESCRIPTION OF EMBODIMENTS

Figure 1:
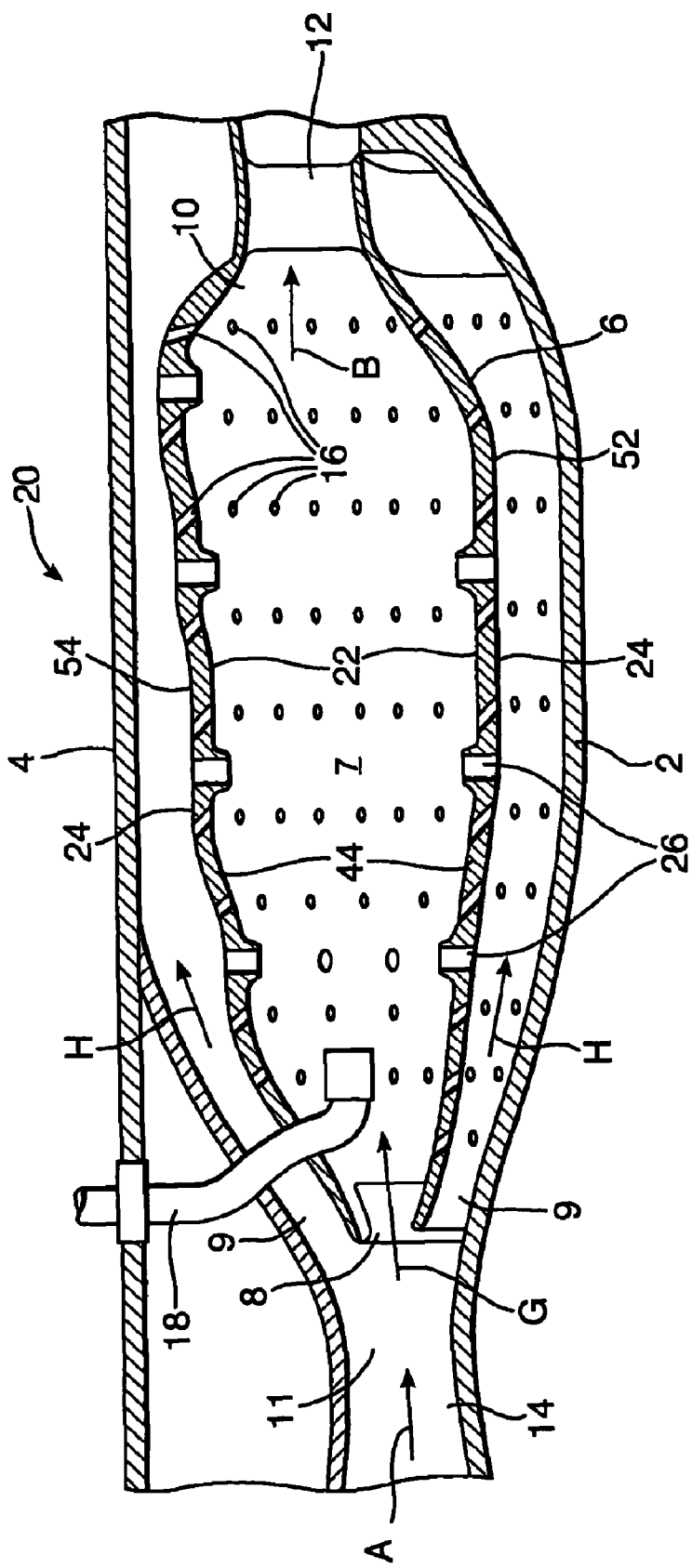
FIG. 1 is a sectional view of a part of an annular combustor section of a gas turbine engine.

Referring to FIG. 1 there is shown a combustor section 20 of a gas turbine engine. Inner and outer annular casing walls 2 and 4 respectively define an annular duct 11. Within this annular duct 11 there is provided an annular flame tube 6. Compressed air from a compressor section (not shown) of the gas turbine engine flows, as shown by arrow A, into this duct 11 through an inlet 14. A portion of this air flows into the interior 7 of the flame tube 6 as shown by arrow G, through an upstream annular flame tube inlet 8. The remainder of the air flows around the outside 9 of the flame tube 6, as shown by arrows H. The air entering the flame tube 6 is mixed with fuel, which is supplied from a number of fuel nozzles 18 within the flame tube 6. The resulting fuel/air mixture in the interior 7 of the flame tube 6 is then burnt to produce a high temperature gas stream. This high temperature gas stream flows along the flame tube 6 as shown by arrow B, through an annular outlet 10 and series of outlet guide vanes 12 at the downstream end of the flame tube 6 and combustor 20, into the turbine section and/or the exhaust of the gas turbine engine.

The walls 44 of the annular flame tube 6 are pierced by a number of cooling holes 16. The cooling holes 16 act as passages through the walls 44 of the flame tube 6. Cool compressed air flowing around the flame tube 6 flows through these holes 16 into the interior 7 of the flame tube 6 and along the walls 44 of the flame tube 6. This flow of cool air through the walls 44 of the flame tube 6 cools the walls 44 of the flame tube 6. The flow of air along the inside walls 22 of the flame tube 6 produces a layer of relatively cool air adjacent to these walls 22 which provides a thermal barrier between the wall 44 of the flame tube 6 and the hot combustion gases within 7 the flame tube 6. A thermal barrier coating 28, generally comprising a layer of ceramic material is also provided on the inside walls 22 of the flame tube 6 which also protects the walls 44 of the flame tube 6 from the hot combustion gases.

The flame tube 6 may also have a number of other, larger, openings 26 within the walls 44 to admit additional compressed air to the interior 7 of the flame tube 6. This additional air being provided to aid further, and more complete combustion within the interior 7 of the flame tube 6.

The flame tube 6 is made from sheet metal, generally a high temperature alloy for example a nickel cobalt or iron superalloy, which is fabricated into the required shape of the flame tube walls 44. The thickness of the metal walls is typically between 1-1.6 mm. Alternatively the metal flame tube 6 can be fabricated from forged rings or even cast.

Figure 3A:
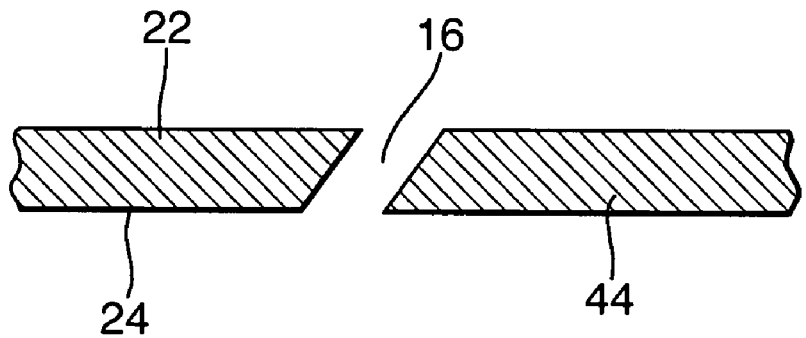

The cooling holes 16 in the flame tube walls 44 are conventionally produced by such methods as electrical discharge machining (EDM) or laser drilling. FIG. 3a, shows a detailed view of a hole 16 produced in the flame tube wall 44. As shown the cooling holes 16 are generally angled in the flow direction and act in effect as passages through the walls 44 of the component. Such angling promotes the formation of a layer of cool air along the inside 22 of the flame tube walls 44. The diameter of the cooling holes 16 is typically between about 0.25 mm and about 0.76 mm.

After production of the cooling holes 16, the first (interior) surfaces 22 of the flame tube walls 44, which define the interior 7 of the flame tube 6, are coated with a thermal barrier coating 28. This coating 28 on the first (interior) surfaces 22 provides the flame tube walls 44 with protection from the high temperature combustion gases. The second (exterior) surfaces 24 of the flame tube 7, being exposed to relatively cool compressor air 9, do not require thermal protection and are accordingly not coated. Typically the coating 28 comprises a MCrAlY, and/or an aluminide bond coat that is first applied to the wall. On top of this bond coat a ceramic coating, for example yttria stabilised zirconia, is deposited. Such coatings are well known in the art and are applied by conventional techniques for example sputtering, electron beam physical vapour deposition (EBPVD), and plasma spraying. An example of such a coating 28 and method of application is described in U.S. Pat. No. 4,321,311, which describes an MCrAlY bond coat and alumina layer and an EBPVD columnar grain ceramic layer. U.S. Pat. No. 5,514,482 describes a diffusion aluminide bond coat with an alumina layer and then an EBPVD ceramic layer. U.S. Pat. No. 5,262,245 describes an MCrAlY bond coat with a plasma sprayed ceramic layer. Further examples are described in U.S. Pat. No. 4,248,940, U.S. Pat. No. 5,645,893 and U.S. Pat. No. 5,667,663.

The thickness of these coatings 28 is typically between about 0.3 mm to about 0.5 mm depending upon the particular requirements of the combustor 20, or component being protected.

Figure 2:
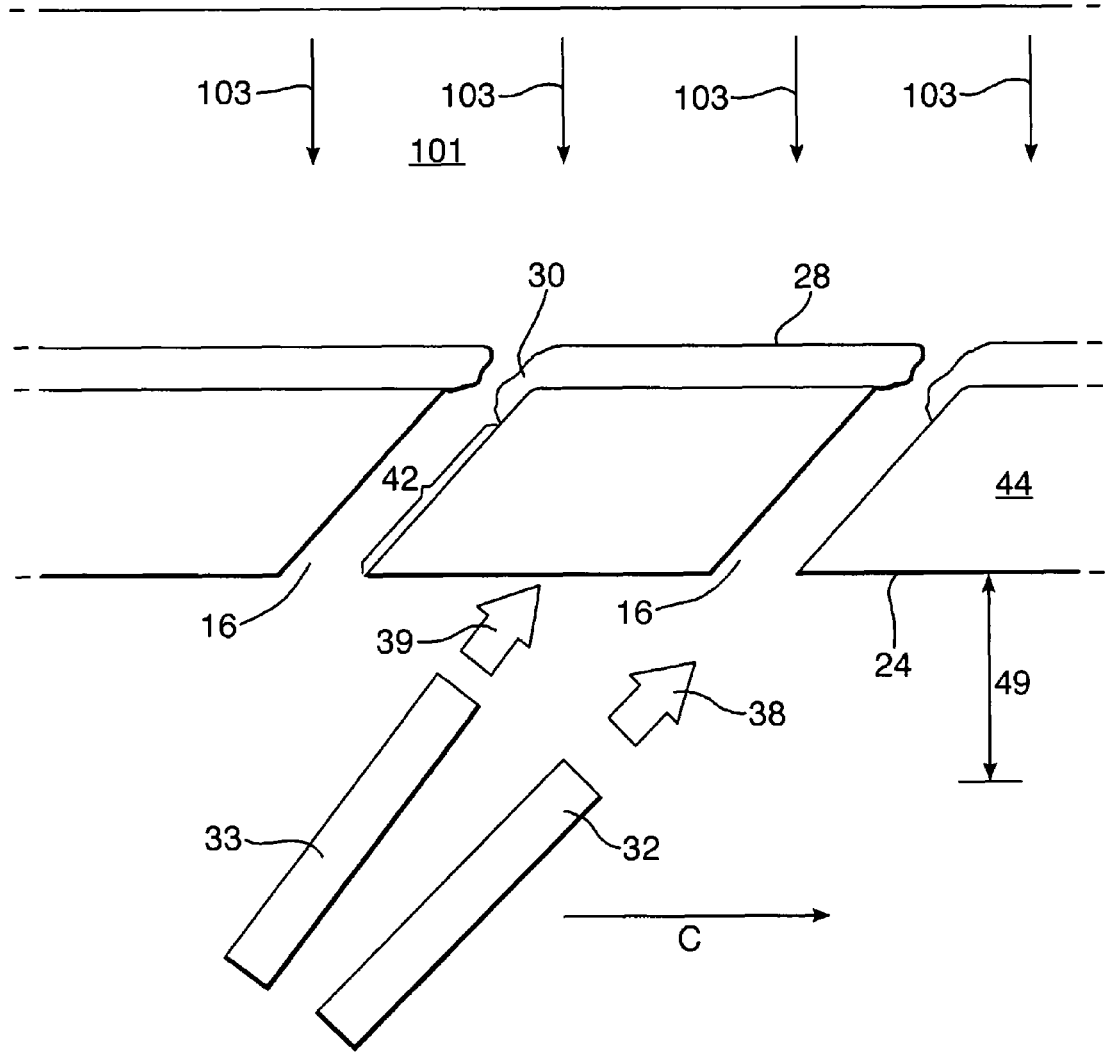
FIG. 2 is an illustrative view of a fluid jet operating on a part of a combustor flame tube wall in accordance with the present invention, FIGS. 3a,b,c are diagrammatic views showing the combustor flame tube wall and cooling hole at various stages during manufacture.
Figure 3B:
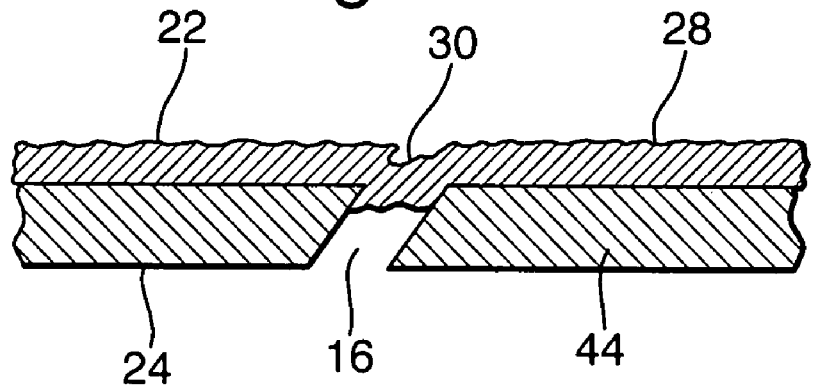

Application of the coating 28 often results in an undesirable accumulation 30 of the coating material within and over the cooling holes 16, as shown in FIGS. 2 and 3b. This accumulation may either partially or totally block the cooling hole 16, thereby restricting or preventing the flow of cooling air through the hole 16 during engine operation. This, if not removed, may result in inadequate cooling of the flame tube wall 44 and a reduction or elimination in the thickness of the cooling layer adjacent the flame tube walls 44. In turn this may then lead to local hot spots on the flame tube wall 44 which may cause the flame tube material to fail and will reduce the service life of the component.

Accordingly after application of the coating 28 the accumulation 30 of coating material within and over the holes 16 is removed. The component, or at least the hole to be cleared is immersed in water 101. Cleaning of the hole is achieved using a high pressure water jet 38 as shown in FIG. 2. High pressure water jet machining and machines capable of carrying out the process are generally known. Examples of such machines are produced and available from Flow Europe GmbH, Germany. Such machines have a nozzle 32 which is supplied with high pressure water, typically between about 10,000 psi (689 bar) and about 60,000 psi (4136 bar). This exits the nozzle 32 through a circular orifice producing a generally circular jet 38 of high pressure water. The diameter of the jet 38 is generally between 0.7 mm and 1.7 mm, and is typically about 1 mm. The nozzle 32 is mounted on a suitable support means (not shown), for example a robot arm, that is capable of moving the nozzle 32, and jet 38, relative to a workpiece, for example the flame tube 6.

The nozzle 32 of the high pressure water jet is immersed within the water 101 along with the component 44. The jet 38 is directed against the exterior surfaces 24 of the flame tube 6 in the region of the holes 16. The jet 38 is angled so that it impinges the walls 44 of the flame tube 6 at substantially the same angle, between 0 to 5 degrees of the axis of the cooling holes 16 and is traversed over the holes 16 in the flame tube walls 44, as shown generally by arrows C. The pressure of the water jet 38, the distance 49 (sometimes call standoff) between the nozzle 32 and the flame tube walls 44, and the length of time that the jet 38 impinges on the surface are all controlled such that there is substantially no machining of the metal of the uncoated exterior surface 24 of the flame tube walls 44. Typically a standoff distance 49 of up to about 20 mm is used.

Figure 3C:
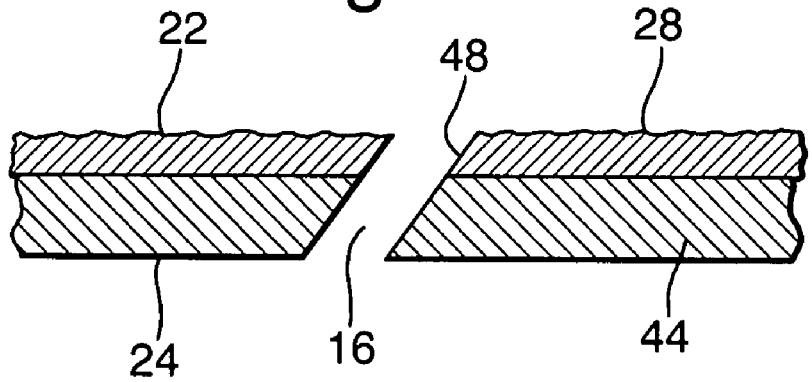

As the jet 38 is traversed across uncoated side 24 of the flame tube walls 44 it encounters a cooling hole 16. The cooling hole is in effect a passage and once the jet 38 enters the hole 16 it is guided and channelled by the unblocked metal sides of a first portion 42 of the cooling hole 16. At the hole exit the jet 38 encounters the coating accumulation 30, or other debris, blocking or partially restricting the hole 16. The coating 28 material, for example a ceramic, is less resistant to the water jet 38 than the metal of the flame tube wall 44. The water jet 38 therefore machines away, by particle erosion, the coating accumulation 30 within the cooling hole 16 until the jet 38 can pass freely through the cooling hole 16. An illustration of a cleared hole 16 is shown in FIG. 3c. As can be seen, by this method, a clear well defined hole exit 48 is produced through the coating 28. The jet 38 is then traversed to the next cooling hole 16 and the process repeated until all of the cooling holes 16 have been cleared. By this method each of the cooling holes 16 are cleared in succession.

The submerged water jet contains 12 mesh glass beads as a media in the clearing process, which is delivered at about 50,000 psi. The beads are delivered to the passageway at a rate equivalent to 60 g every minute.

Since the jet 38 is guided by the first portion 42 of the hole 16 accurate alignment of the jet 38 with the hole 16 is not required using this method. Additionally since, in this case, the cooling holes 16 are of a smaller diameter than the water jet 38, the jet 38 will still overlap the hole 16 even when not fully aligned. Furthermore since the water jet 38 is directed against the exterior side 24 of the flame tube 6, the coating 28 on the interior surface 22 that is not within the hole 16 is not exposed to the water jet 38. Consequently the possibility of the remainder of the coating 28, on the interior side 22 of the wall 44, being damaged by the water jet 38 is substantially eliminated. This is not the case in the prior art methods where a machining jet or abrasive fluid is supplied from the coated interior side 22 of the component.

A second water jet nozzle is directed towards the passage after the passage has been addressed by the first jet. The second water jet, unlike the first water jet, does not contain glass beads. Instead, the flow is water and air.

Beneficially, the two jets clean using slightly different mechanisms. Where particles are present in the water jet the jet cleans using an abrasive action and therefore erodes the coating overspray, but typically will work with difficulty on a fully blocked hole. By contrast the water jet containing air removes the coating using a fracture mechanism, which works well even when the hole is fully blocked.

The inclination of the nozzle angle to hole during the glass bead cleaning has to be in a negative rake condition between 0 and 5 degrees. This removes all bond coat or TBC from the hole without damaging the hole entrance. If a negative rake condition is not applied then hole shape and angle can be adversely affected. When water/air cleaning is applied then a positive angle is required to reduce chipping of TBC at hole exit.

By cleaning the component under water, with the source of the cleaning jets also being located under water, the noise of the jets is attenuated. Use of high pressure jets in air produces a level of noise in excess of 120 dB. Where the jet does not contain solid particles the noise level is further increased.

When the cleaning operation is performed while the component and jet source is submerged in water 101 the level of noise is reduced to around 90 dB.

In the preferred embodiment a current 103 is induced in the water 101 that flows around the component 44. The flow has a low pressure but a high volume. Beneficially, the flow further reduces the noise perceived by a sensor located out of the water 101 to around 70 dB. The direction of water flow 103 has minimal bearing on the noise reduction however, a flow towards the surface of the component having the coating 28 is preferred.

In an alternative method the water jet 38 is traversed repeatedly across the uncoated side of the flame tube wall 44 containing the holes 16. During each traverse, or pass, the jet periodically encounters the cooling holes 16 and flows through them. Generally a traverse rate of between about 0.5 m/minute and 10 m/minute, and typically of 2 m/minute is used for a substantially linear traverse of the jet 38. At such a rate there is not sufficient time for the jet to remove all of the coating 30 from within the hole 16 in a single pass. Consequently only a portion of the material 30 is removed from within the hole 16 during a single pass of the jet 38 over, and through, a hole 16. The hole 16 is fully cleared after a number of individual passes of the jet 38 over and through the hole 16.

The advantage of this method is that a large number of holes 16, within a single pass of the jet, can be cleared at substantially the same time. The jet 38 also does not have to be paused and directed individually at each hole 16. Consequently this alternative method requires even less alignment of the jet 38 with the holes 16 and provides an even faster method of clearing the holes 16. Furthermore since accurate control of the water jet 38 is not critical in this method, less accurately controlled water jet machines that are simpler and cheaper can be used.

Figure 4:
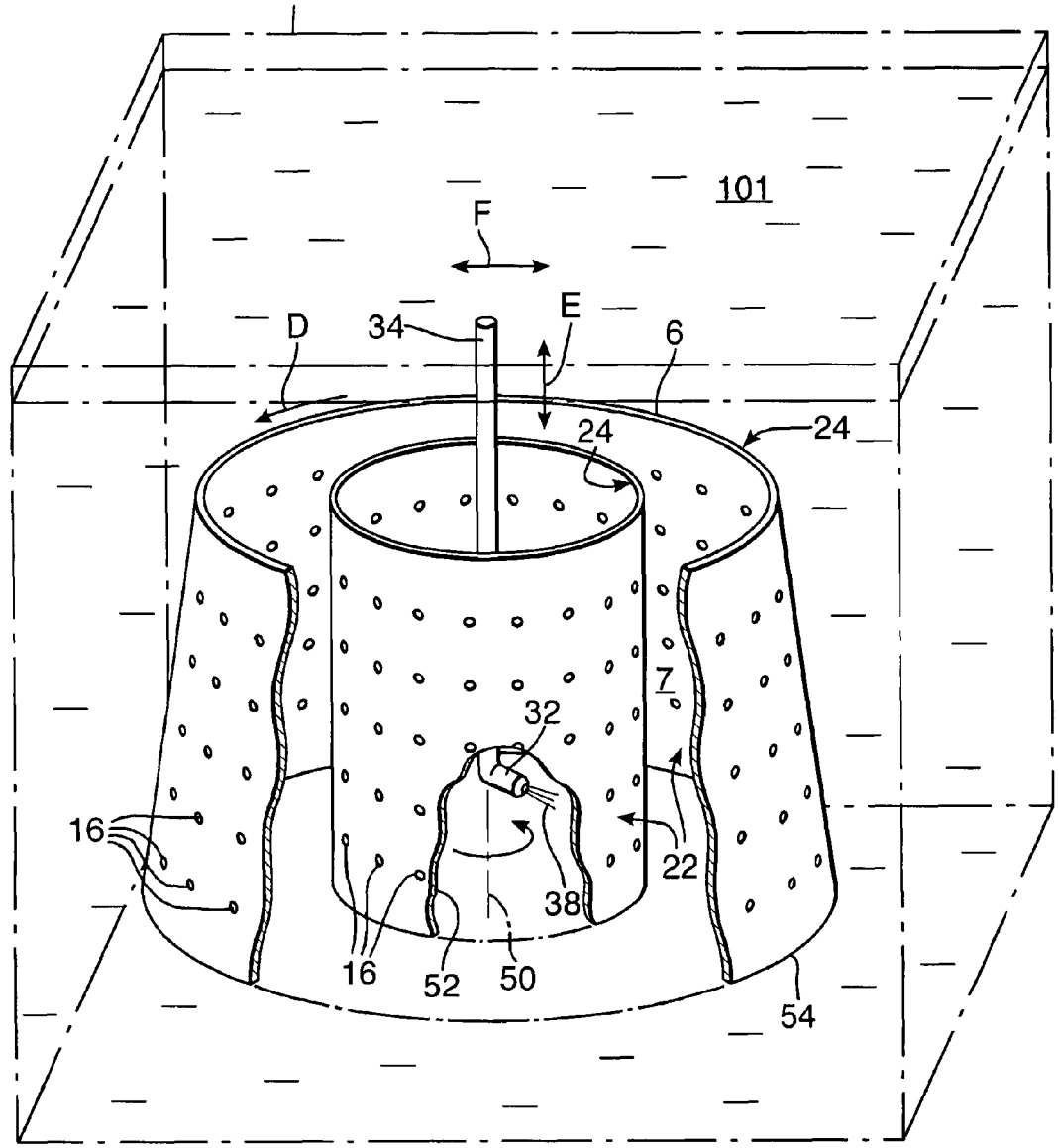
FIG. 4 illustrates a second embodiment method of machining holes in a combustor flame tube according to the present invention.

A further variation of the above method is shown in FIG. 4. The flame tube 6, as described previously with reference to FIG. 1, has a coating 28 on the inside 22 walls of the annulus defined by the flame tube 6. The flame tube 6 is submerged in a bath 105 containing water 101. A radially directed water jet 38, preferably containing a solid media, is traversed across the cooling holes 16 by rotating the flame tube 6 about its longitudinal axis 50, as shown by D. The jet 38 thereby acts on an entire circumference of the flame tube wall 44, in which the holes 16 have been drilled, during rotation of the flame tube 6. The water jet 38 is then axially translated, as shown by arrow E, to impinge a further circumference, and series of holes 16, axially along the flame tube 6. The jet 38 is also moved radially, shown by arrow F, relative to the flame tube walls 44 to achieve the required standoff distance 49. Rotation of the flame tube 6 is carried out by any conventional means, for example by mounting the flame tube 6 upon a rotary table. The above rotary system provides a simpler and easier method of traversing the jet 38 over the surface of the component, and higher traverse rates than can be easily achieved with a linear system can be produced. In a rotary system a traverse rate of the jet 38 over the surface of the component of 5 m/s can be used. It will be appreciated that with such rapid traverse rates only a very small amount of coating 28 material will be removed in any pass of the jet over the hole 16.

In the arrangement shown in FIG. 4 the jet 38 is shown being used to clear the holes 16 in the inner walls 52 of the flame tube. It will be appreciated that to clear the holes 16 in the outer walls 54 the jet 38 is mounted outside of the outer wall 54 of the flame tube 6, with the jet 38 being directed radially inward. By this method the holes 16 that have been drilled within the flame tube walls 44 are cleared by repeated passes of the water jet 38 as the flame tube 6 rotates.

Additional jet heads 32 may be mounted on the same support to increase the speed at which the component is cleaned. These heads are spaced at an equivalent spacing to the passages in the component to be cleaned.

As discussed with the embodiment described with respect to FIG. 2, the water jets that include the solid media beads are followed by a second head that ejects a water and air jet towards the passages. This head may be duplicated to decrease the time required to process the component.

In a specific illustrative test of the basic method of the invention a 1 mm thick piece test piece of C263, a nickel cobalt superalloy, was laser drilled with a number of 0.5 mm holes, in a row, with each hole inclined at an angle of 30°. One side of the test piece was then then coated with a 0.4 mm thick layer of a standard ceramic thermal barrier coating. In this test the coating comprised a 0.1 mm layer of MCrAlY bond coat, applied by plasma spraying, with a 0.3 mm layer of yttria stabilised zirconia ceramic deposited by plasma spraying on top of the bond coat. This coating at least partially blocked the pre drilled holes. A 1 mm circular water jet at a pressure of 50,000 psi and containing 12 mesh glass beads, oriented at the same 30° angle as the holes, was directed at the metal side of the test piece with the water jet nozzle approximately 10 mm from the test piece. This jet was traversed across the row of holes at a constant rate of 2 m/minute. A second 1 mm circular water jet at a pressure of 50,000 psi, oriented at the same 30° angle as the holes, traversed with the first water jet at a constant rate of 2 m/minute and was directed at the metal side of the test piece after the first with the water jet nozzle approximately 10 mm from the test piece. The second water jet contained entrained air bubbles.

Inspection of the holes showed that they had been adequately cleared of the ceramic coating previously deposited within them. The coating around the holes was also substantially unaffected with a clean hole having been machined through the coating by the water jet. There was also no significant damage to the surface of the test piece that was exposed to the water jet during traversal of the jet between holes. Although this method has been described in relation to clearing holes in annular flame tubes 6 it will be appreciated that it can be applied to other known types of combustors which incorporate cooling holes, or other small holes, and have a coating material applied to one side of their walls in the region of the holes. For example it can be used with cannular combustors that comprise a number of individual cylindrical combustion cans disposed around the engine. The method of the invention can also be applied to clearing cooling holes within the combustor tiles of a tiled combustor. On side of the tiles being generally coated with a thermal barrier coating. Such tiled combustors also being well known in the art.

The method of the invention can also be applied to other components both within the combustion section 20 of a gas turbine engine and more generally. Indeed it is envisaged that it can be used to manufacture any component which, during manufacture, may have holes that are blocked, or partially blocked, by a coating material. For example it can also be applied to the manufacture of turbine blades which have cooling holes and are coated, on their outside, with a thermal barrier coating. A restriction on the application of the method though is that there must be sufficient access for the jet to be directed at the cooling holes. This could possibly be a problem for some, in particular small, turbine blades where there must be sufficient room for the nozzle and jet to be inserted and operate inside of the blade.

The method is not limited to use in removing thermal barrier protective coatings from within cooling holes. Other coatings may similarly block, or partially block any holes in the flame tube 6, or any other component. Such coatings could be applied, for example, to offer corrosion protection of the component.

It will also be appreciated that the method can be applied to the repair of components as well as in their original manufacture. During repair and overhaul of used components and coating material is usually removed. A new coating is then applied which will generally block or partially block the original cooling holes in the component. Accordingly the method of the invention can then be applied to remove this excess coating material from these cooling holes.

In the embodiments of the invention a water jet 38 has been described as being used to clear the holes. In alternative embodiments though other fluids could be used.

Various modifications may be made without departing from the scope of the invention.

We claim:

1. A method of removing a deposit from a passage extending through a component, the method comprising:
   immersing the passage within a liquid bath;
   directing a first liquid jet at the passage from a source within the liquid bath and with a sufficient velocity so as to remove at least a portion of the deposit, the component being made from metal and the deposit is ceramic, and contiguous with a coating provided on a first surface of the component; and directing a second liquid jet at the passage from a second source within the liquid bath, wherein an angle of the first liquid jet is in line or at a negative rake angle relative to a center axis of the passage;

an angle of the second liquid jet is at a positive rake angle relative to the center axis of the passage;

the first liquid jet and the second liquid jet are directed at the passage from a second surface of the component opposite the first surface; and the first liquid jet removes the at least a portion of the deposit without substantial removal of the coating provided on the first surface of the component.

2. A method according to claim 1, wherein the first liquid jet further comprises solid particles disposed therein.

3. A method according to claim 2, wherein the solid particles are glass beads.

4. A method according to claim 1, wherein the second liquid jet further comprises gas admixed therein.

5. A method according to claim 1, wherein the component has a plurality of passages, the method further comprising:

directing the first liquid jet at a first one of the plurality of passages and then traversing the first liquid jet across a second surface of the component opposite the first surface of the component to a second passage and directing the first liquid jet at a second one of the plurality of passages.

6. A method according to claim 5, wherein a second liquid jet is traversed with the first liquid jet to direct the second liquid jet at the first one of the plurality of passages after the first liquid jet has been directed thereat.

7. A method according to claim 5, wherein the first liquid jet is traversed at a constant rate over a region of the second surface of the component in which the passages are located.

8. A method according to claim 5, wherein substantially all the deposit within the first one of the plurality of passages is removed before the first liquid jet is traversed to the second one of the plurality of passages.

9. A method according to claim 1, wherein the component is rotated about an axis and relative to the first liquid jet such that the first liquid jet is intermittently directed at the passage.

10. A method according to claim 9, wherein the axis is orthogonal to the direction in which the first liquid jet traverses.

11. A method according to claim 1, wherein the liquid bath within which the passage is immersed has a current which flows towards the first surface of the component, in a direction which extends from the first surface to the second surface.

12. A method according to claim 1, wherein the passage is arranged to provide, in use, a cooling flow for the component.

13. A method according to claim 1, wherein the component is a combustor flame tube.

14. A method according to claim 1, wherein the component is a turbine blade.

15. A method according to claim 1, wherein
the first liquid jet contains abrasives, and
the second liquid jet contains water, or water and air.

16. A method according to claim 1, wherein the first liquid jet and the second liquid jet are delivered at more than 10,000 psi to about 60,000 psi.

17. A method of removing a deposit from a passage extending through a component, the method comprising:

immersing the passage within a liquid bath;

directing a first liquid jet at the passage from a source within the liquid bath and with a sufficient velocity so as to remove at least a portion of the deposit, the component being made from metal and the deposit is ceramic, and contiguous with a coating provided on a first surface of the component; and subsequently directing a second liquid jet at the passage from a second source within the liquid bath, wherein the first liquid jet removes the at least a portion of the deposit without substantial removal of the coating provided on the first surface of the component, the first liquid jet and the second liquid jet are directed at the passage from a second surface of the component opposite the first surface;

the first liquid jet contains mesh glass beads and the second liquid jet contains water and air.

18. A method according to claim 1, wherein the angle of the first liquid jet chosen is between 0 and 5 degrees.

19. A method according to claim 1, wherein the first and second water jet are traversed in a circumferential direction.

20. A method according to claim 1, wherein the passage is inclined at an angle of 30 degrees.

* * * * *